April 29, 1958 J. J. MISKEL 2,832,701
METHOD OF MAKING DRAIN-CLEAR CONTAINERS
Filed Sept. 25, 1953
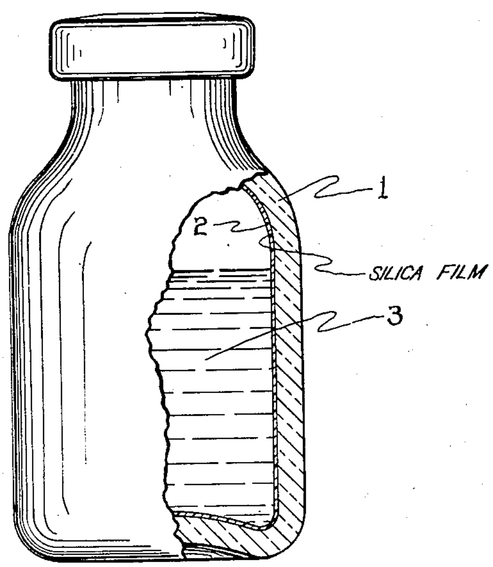
INVENTOR.
JOHN J. MISKEL
BY Arthur J. Connolly
HIS ATTORNEY.

United States Patent Office 2,832,701

Patented Apr. 29, 1958

2,832,701

METHOD OF MAKING DRAIN-CLEAR CONTAINERS

John J. Miskel, Brooklyn, N. Y., assignor to Chas. Pfizer & Co., Inc., Brooklyn, N. Y., a corporation of Delaware Application September 25, 1953, Serial No. 382,304

2 Claims. (Cl. 117—97)

This invention relates to containers for liquids, which containers have the property of permitting the contained liquid to drain free of the walls of the vessel. In particular it is concerned with containers for liquid pharmaceutical preparations. The present application is a continuation-in-part of my co-pending application Serial No. 184,603, filed September 13, 1950, now abandoned.

The losses which have been encountered by adhesion of liquid materials to the walls of containers have always presented a problem. This is particularly true when the packaged product is an expensive one, such as is the case with various pharmaceuticals. Numerous attempts have been made to overcome this difficulty. One such prior art example is the U. S. Patent No. 2,504,482, issued on April 18, 1950. The containers described therein consist of glass bottles coated with a thin film of a silicone oil. Although aqueous pharmaceutical preparations packaged in such bottles drain clear of the walls, there are several definite drawbacks to this type of package. In the first place, it has been found extremely difficult to confine the silicone film to the inside of the bottle. The coating material tends to creep over the neck of the bottle and down the outer walls, particularly during the drying step. When the outer walls of the bottle become coated with silicone, the labels which must be placed on the outer walls of such bottles become non-adherent. If glass bottles of the type used in packaging penicillin, streptomycin and the like are coated on their inner walls with a film of a silicone oil and lubricant-treated rubber stoppers are applied to these bottles by mechanical means, the stoppers have a tendency to slide through the neck and into the bottle. Such bottles must, of course, then be removed from the packaging machinery. In addition, the silicones used in the foregoing treatment are rather expensive and further add to the cost of the pharmaceuticals packaged in the treated containers.

It is an object of this invention to provide containers for liquid preparations and, in particular, for aqueous pharmaceutical preparations, which do not have the disadvantages of the silicone-coated containers and yet possess all the advantages and some further advantages over the silicone-treated containers.

I have found that the application of a coating of silica to the inner walls of the containers achieves the desired results. The silica is preferably applied to the inner surface of the bottle in the form of a dilute aqueous suspension of polymerized silicic acid. Such products are commercially available in fairly concentrated form and may be diluted as desired for use in my process. An example of this type of material is the product marketed under the trade name "Ludox" by E. I. du Pont de Nemours & Co., which consists of a 30 percent aqueous suspension of silica in the form of polymerized silicic acid stabilized with alkali. The micelles of this material average about 15 millimicrons in diameter.

While the colloidal silicic acid suspensions may be used at full strength, i. e. in silica concentrations of 30% by weight of the suspension, it is preferred to dilute them to a considerable extent to facilitate the formation of a more continuous film than is possible at high concentrations. A discontinuous film obviously does not exhibit the drain free characteristics desired in accordance with this invention. Suspensions containing from about 0.016 to 1.0% of silica have been found to be quite effective and are preferred for optimum results. However, it is important that the pH of these suspensions be adjusted to the proper value before application of the suspensions to the containers to be coated. I have found that when the pH of the dilute, polymerized silicic acid suspensions is adjusted to a value of from about 3 to 6, the colloidal system is rendered sufficiently unstable to favor the desired deposition of silica in a continuous film when the inner walls of containers are contacted therewith. A pH of about 4 to 5 is preferred for optimum results. This pH can be attained by acidifying the dilute silicic acid with a suitable acid, such as hydrochloric acid. However, it is preferred to acidify the concentrated silicic acid suspension and the aqueous diluent separately and combine the two in order to achieve the desired pH of the final suspension. To illustrate, 300 gallons of water are brought to a pH range of between 4.0 and 4.5 by addition of 200 cc. of 10% hydrochloric acid. A volume of 2500 cc. of 30% Ludox, having an initial pH of about 9.5 to 10.5 units, is acidified with 300 cc. of 10% hydrochloric acid to a pH of 4 to 4.5. The acidified Ludox is then added to the acidified water and mixed by any convenient means to form a uniform suspension. Air agitation for about two to three minutes has been found to be a convenient means of mixing. For best results, the pH of both the water and the Ludox are adjusted in an unidirectional manner, that is, without the addition of alkali if an excess of acid results in a lower pH than desired.

Suitable buffering agents can advantageously be employed to assist in maintaining the pH at the desired level. Furthermore, the stability of the acidified silicic acid suspensions of this invention may be further altered to favor the deposition of a silica coating by the addition of such buffering agents and/or electrolytes. Various salts which form univalent, divalent and trivalent ions are useful for these purposes. The following are illustrative: sodium chloride, monosodium phosphate, sodium citrate, sodium acetate, sodium carbonate, sodium metaborate, calcium chloride, and aluminum sulfate. The quantity of the salt to be added will vary with the particular electrolyte selected and with the pH of the silicic acid suspension. In general, an amount of electrolyte from about 0.01 to 1.0% by weight of the final acidified silicic acid suspension is effective for most purposes in the desired pH range of about 3 to 6.

It will be appreciated that the time over which the silicic acid suspensions of this invention can be employed will vary considerably, depending upon the pH of the suspension, the type and quantity of the salts present, if any, and other factors affecting the stability of the colloidal system. For maximum coating efficiency it is recommended that the original acidified suspension be used for a period of no more than about three to four hours. Frequent agitation of the suspension to provide a uniform dispersion of the silica materials is helpful in prolonging the effective life of the suspension.

The coatings of silica may be applied to the inner walls of containers in various manners; thus bottles may be completely immersed in the aqueous suspension and then drained before drying. Drying causes the deposition of a very thin, transparent, continuous, silica film on the surface of the bottle. Said film is highly insoluble, unvitrified and inert to chemical reagents. Furthermore, it has the important property for my purposes of repelling the usual solvents and suspension media, particularly water. Rather than applying the coating material by immersion to the entire surface, it may be applied to the inner surface only of the bottle by means of some such device as a spray nozzle or a jet placed within the bottle.

The preferred method of application is to invert the clean bottles over small nozzles from which a stream of the dilute silica suspension is forced. The coating material then flows down over the inner walls of the containers, and sufficient material adheres to these surfaces. All excess material drains off, and the bottles may then be dried to deposit the silica film on the inner surface of the bottle. This procedure has the advantage of confining the treatment to the inner surface of the container, but this is not essential, as it is in the case of the silicone treatment. Any silica film that may be formed on the outer surface of the bottle in no way prevents the ready adhesion of all types of labels to such outer surface.

The excess coating liquid that drains from the bottles may be reused, if desired. Large, solid particles may be removed by filtration before such reuse. The very dilute suspensions used allow for discarding the suspension after one use, if desired. The bottles are then dried and may be sterilized simultaneously in the drying operation. Alternatively, steam sterilization, or other methods of sterilization may be employed after drying without disturbing, in any way, the film which has been deposited on the inner surfaces of the containers. Drying should be initiated within about two hours after deposition of the silica film in order to preserve the continuity of the films so deposited. Once the film has been dried, it is not removed by aqueous solutions or by organic liquids other than those that would attack glass itself.

Not only are glass bottles treated in accordance with my invention very useful for the packaging of aqueous solutions or aqueous suspensions of various materials such as pharmaceuticals, but they also show advantages over untreated bottles for use in packaging of oily-type materials. Examples of such materials are sesame oil or peanut oil suspensions of penicillin salts, and the like. Such oily suspensions readily flow down the inner surfaces of the treated bottle, so that no appreciable amounts adhere to the container above the surface of the liquid.

When practicing my invention, it may be readily ascertained how much of the material remains in a multiple dose container, after a part has been removed. The excess that is ordinarily added to the bottle to compensate for adhesion to the inner surfaces of the container may be greatly reduced. This, of course, means a definite saving, since the material which adheres to the walls of the bottle after its use is a complete loss. In addition, the difficulty referred to above with regard to the stoppering of silicone-treated bottles with lubricant-treated stoppers is completely eliminated.

In one example of the operation of my process, clean, penicillin-type glass containers are used as received from the manufacturer. These are fed into a machine which consists of a series of intermittently operated, continuously moving, small metal jets. The bottles are placed in an inverted position over the series of small jets and are thus moved through the machine. A diluted suspension of colloidal silica is forced through the jets and into the bottles. This may be a commercially available suspension of polymerized silicic acid, that is diluted with sterile, pyrogen-free water to the desired concentration before use. The excess material immediately drains off leaving a thin film of the aqueous suspension adhering to the inner surfaces of the battle. The aqueous suspension serves not only to coat the bottle, but also to rinse any fine solid particles therefrom. The treated bottles are dried in an inverted position in an oven, until all moisture has been removed. This causes the film of silica to become deposited on the inner surface. Dry sterilization of the bottles and destruction of any pyrogenic material therein may be accomplished in the same operation, if the temperature and the length of treatment is adequate. I have found that drying and sterilization may conveniently be carried out by heating the bottles at the usual bacteriological sterilizing conditions of from 170° to 250° C. for a period of about 1 to 5 hours. A period of 2 hours at 190° C. is quite effective, although a longer period at a somewhat lower temperature can also be used. Care should be taken not to exceed a temperature of about 350° C. for any extended period of time, otherwise destruction of the silica film and the desired drain clear characteristics of the containers may result. Partial destruction of the film has been observed after employing a temperature of 350° C. for one hour, whereas complete destruction occurred at 400° C. for a similar period. In no event is the sterilization permitted to reach a temperature sufficiently high to vitrify the thin silica film. After drying and sterilization the bottles are allowed to cool, maintaining them under sterile conditions during storage and while being filled and capped.

I have coated the inner surfaces of glass bottles with silica in a manner as described above, using suspensions of colloidal silica having concentrations of 1%, 0.5%, 0.25%, 0.125%, 0.06%, 0.03%, and 0.016% by weight Each of the bottles was dried and sterilized in the manner described, and aqueous suspensions of procaine penicillin were placed therein. The treated, filled bottles were evaluated by visual observation of the degree of adhesion of the procaine penicillin suspension to the upper walls of the bottle above the liquid, when the bottles were inverted or vigorously shaken and then allowed to stand in normal position. It was found that all of the bottles treated with the various concentrations of silica suspensions were equally good, that is, in each case the suspension of procaine penicillin drained rapidly and cleanly from the upper inner surfaces of the bottle as soon as the bottle was placed in its normal upright position.

A total of three thousand 10-milliliter penicillin-type glass bottles were treated with an 0.016% suspension of silica in the manner just described, and samples of these bottles were filled with various liquid pharmaceutical preparations for further evaluation. It was found that the various other aqueous and oily preparations tested readily drained from the walls of the bottles, just as had the aqueous procaine penicillin suspension. The heat stability of such drain-clear bottles was evaluated by storing a group of the bottles containing an aqueous suspension of procaine penicillin at the elevated temperatures of 38° C. and 55° C. for periods of more than a month. At the end of this time the film that had been formed on the inner surfaces of the bottle showed no evidence of deterioration. The aqueous suspension still flowed freely and completely from the coated surfaces.

A number of the bottles coated in the manner described above were readily labeled with various types of labels, including ordinary gummed labels as well as those impregnated with a thermally softened plastic.

One of the above mentioned penicillin-type glass bottles treated in accordance with my invention is shown in the accompanying drawing. In this drawing 1 represents the glass body of the bottle, 2 represents the silica film on the inner surface thereof, while 3 represents the procaine penicillin suspension. The advantage of the silica film, as explained above, is that the procaine penicillin suspension will not adhere thereto, thus assuring that the bottle will drain clear promptly.

It has been observed that the silica coatings of the present invention have the peculiar property of being readily fogged in the presence of water vapor. This property is not shared by many other coatings or by the uncoated surfaces, and therefore, offers a convenient means for checking the newly coated containers for continuity of the films therewithin.

It will be recognized by those skilled in this art, that many other applications of my invention may be made. Other containers of various chemically resistant materials, such as ceramics and appropriate metals, may be treated in the manner I have described. The coating may be applied in various manners, by spraying, either manually or mechanically, and various types of commercially available machines designed for washing or rinsing containers may be used. The drying operation may be accomplished at elevated temperature atmospherically or under reduced pressure if desired. Once most of the moisture has been removed, the film adheres tenaciously to the walls of the containers. It is not intended to limit protection of my invention to the specific examples given for purposes of illustration, but rather such protection should only be limited to the extent required by the specific wording of the appended claims.

I claim:

1. A method of making a glass liquid dispensing container clear draining which comprises the steps of wetting its inner walls with an aqueous suspension of colloidal silica having a pH ranging from about 3 to 6, draining off excess solution, drying said container at an elevated temperature providing bacteriological sterilizing conditions, and said elevated temperature being maintained below 350° C.

2. A method of preparing a sterile, clear draining, liquid dispensing glass container of rigid and chemically resistant construction, which comprises wetting the inner walls of such a container with a buffered, aqueous suspension of colloidal silica having a pH from about 4 to 5, draining off excess material, and then drying the container at an elevated temperature below about 350° C. to form a continuous film of silica on said inner walls.

References Cited in the file of this patent

UNITED STATES PATENTS

| | | |
|---|---|---|
| 1,077,950 | Arsem | Nov. 4, 1913 |
| 1,297,724 | Patrick | Mar. 18, 1919 |
| 2,329,632 | Marsden | Sept. 14, 1943 |
| 2,366,516 | Geffcken | Jan. 2, 1945 |
| 2,428,357 | Cohen | Oct. 7, 1947 |
| 2,442,976 | Heany | June 8, 1948 |
| 2,504,482 | Goldman | Apr. 18, 1950 |
| 2,527,134 | Johnson | Oct. 24, 1950 |
| 2,661,438 | Shand | Dec. 1, 1953 |

FOREIGN PATENTS

| | | |
|---|---|---|
| 561,750 | Great Britain | June 2, 1944 |